(12) United States Patent
Jenkins

(10) Patent No.: US 6,763,630 B1
(45) Date of Patent: Jul. 20, 2004

(54) FREE STANDING FISHING ALARM

(76) Inventor: Charles E. Jenkins, 3569 Woodville Rd., Blanchester, OH (US) 45107

(*) Notice: Subject to any disclaimer, the term of this patent is extended or adjusted under 35 U.S.C. 154(b) by 0 days.

(21) Appl. No.: 10/277,312

(22) Filed: Oct. 22, 2002

(51) Int. Cl.[7] .............................................. A01K 85/01
(52) U.S. Cl. ............................................................ 43/17
(58) Field of Search ......................... 43/17, 16; 302/202

(56) References Cited

U.S. PATENT DOCUMENTS

| | | | | |
|---|---|---|---|---|
| 2,448,681 A | * | 9/1948 | Nutter .............................. | 43/17 |
| 2,538,788 A | * | 1/1951 | Massino .......................... | 43/17 |
| 2,555,073 A | | 5/1951 | Zdankoski | |
| 2,574,333 A | * | 11/1951 | Kuczynski ...................... | 43/17 |
| 2,587,223 A | * | 2/1952 | Robinson ........................ | 43/17 |
| 2,791,858 A | * | 5/1957 | Kernodle ........................ | 43/25 |
| 2,933,844 A | * | 4/1960 | Seigle ............................. | 43/17 |
| 2,986,835 A | * | 6/1961 | Ordinetz et al. ............... | 43/17 |
| 3,024,561 A | * | 3/1962 | Wyatt .............................. | 43/17 |
| 3,250,036 A | * | 5/1966 | Wenger ........................... | 43/17 |
| 3,440,753 A | * | 4/1969 | Kelley ............................. | 43/17 |
| 3,571,536 A | * | 3/1971 | Sparks ........................... | 200/60 |
| 3,740,888 A | * | 6/1973 | Young, Jr. ...................... | 43/17 |
| 3,913,255 A | * | 10/1975 | Fillmen .......................... | 43/17 |
| 4,023,298 A | * | 5/1977 | Story .............................. | 43/17 |
| 4,455,779 A | * | 6/1984 | Cosic ............................. | 43/17 |
| 4,641,453 A | | 2/1987 | Roberts, Sr. | |
| 4,660,316 A | * | 4/1987 | Gamelin ......................... | 43/17 |
| 4,811,512 A | | 3/1989 | Amos | |
| 5,261,180 A | * | 11/1993 | Foster et al. .................... | 43/17 |
| 5,274,943 A | * | 1/1994 | Ratcliffe et al. ................ | 43/17 |
| 5,501,028 A | | 3/1996 | Hull et al. | |
| 5,771,624 A | * | 6/1998 | Vickery et al. ................. | 43/17 |
| 5,829,181 A | * | 11/1998 | Fielder et al. ................. | 43/17 |
| 5,867,931 A | * | 2/1999 | Morris et al. ................... | 43/17 |
| 5,894,691 A | * | 4/1999 | Zepeda, Sr. .................... | 43/17 |
| 5,941,015 A | | 8/1999 | Jenkins | |
| 5,987,804 A | | 11/1999 | Shearer et al. | |
| 6,101,757 A | * | 8/2000 | Draghici ........................ | 43/17 |
| 6,158,163 A | * | 12/2000 | Fox ............................ | 43/43.13 |
| D443,020 S | | 5/2001 | Ratza et al. | |
| 6,289,627 B1 | | 9/2001 | Gibbs et al. | |
| 6,293,043 B1 | * | 9/2001 | Zwettler ......................... | 43/17 |
| 6,318,879 B1 | * | 11/2001 | Huang ......................... | 362/205 |
| 6,446,380 B1 | * | 9/2002 | Radosavljevic et al. ....... | 43/17 |

* cited by examiner

Primary Examiner—Charles T. Jordan
Assistant Examiner—Jordan Lofdahl
(74) Attorney, Agent, or Firm—John D. Gugliotta; P. Jeff Martin; Olen L. York, III

(57) ABSTRACT

A free standing fishing alarm is provided in which the head or tail member(s) may be threadably attached to the body member, creating a water tight environment for the circuitry and associated components, or removed from the body member to allow service and maintenance of the device. The body member internally houses the circuitry, including batteries, and the lighting and audible signaling means. The body member externally houses a clamp means, a toggle switch, a fastening means, and two opposable ends with threads for receiving the head and tail members so as to provide a unified device. A user can simply attach the device to a fishing rod or a stake, cast the fishing line, place the line within the clamp means, flip the toggle switch "on" and wait for the "big one" to strike.

17 Claims, 5 Drawing Sheets

FREE STANDING FISHING ALARM

RELATED APPLICATIONS

The present invention was first described in Disclosure Document Registration 500,510 filed on Sep. 27, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to fishing equipment and more particularly to an alarm device for alerting a fisher that a particular fishing line has a bite.

2. Description of the Related Art

As is well known in the art, many alarm devices for alerting fishers of fish strikes have been developed. However, the prior art is filled with devices that are bulky, complicated to set up, too time consuming in set up or a combination of the three. Additionally, the alarm portion of many prior art devices is activated by the slightest movement of the line, which leads to inadvertent alerts that may annoy neighboring fishers and creates the hassle of having to reset the alarm.

The present invention is directed to an improved alarm device and includes a sleek, light weight body that is easily fastened to the frame of a fishing rod or a stake. The fishing line is placed within a clamp and the alarm is set. If a fish strikes that particular line with sufficient force to pull the fishing line from the clamp, the alarm system, which includes a visual and audible signal, will be triggered and will alert the fisher that a strike is in progress. The alarm system is easily deactivated through the flip of a switch.

A search of the prior art did not disclose any patents that read directly on the claims of the instant invention; however, the following references were considered related.

U.S. Pat. No. 6,289,627 issued in the name of Gibbs et al., describes a folding stowable trolling rig for a plurality of fishing rods.

U.S. Pat. No. 5,987,804 issued in the name of Shearer et al., describes a holder for multiple fishing rods pivotally attached to the support column of a swivel mounted boat chair.

U.S. Pat. No. 5,941,015 issued in the name of Jenkins, describes a multiple featured fishing system.

U.S. Pat. No. 5,501,028 issued in the name of Hull et al., describes a combination fishing rod holder and bite indicator for use by bank fisherman.

U.S. Pat. No. 4,811,512 issued in the name of Amos, describes an apparatus for audibly alerting a fisherman of a bite on a fishing line associated with one or more unattended rod and reel assemblies.

U.S. Pat. No. 4,641,453 issued in the name of Roberts Sr. Project Director, describes a fishing rod holder.

U.S. Pat. No. 2,555,073 issued in the name of Zdankoski, describes a combination fishing box, creel, pole holder, bait box, and seat.

U.S. Pat. No. D443,020 issued in the name of Ratza et al., is an ornamental design for a fishing rod holder.

Consequently, a need has been felt for providing a fishing alarm apparatus that is light weight and inexpensive, and yet easily serviceable by the user when in the field.

SUMMARY OF THE INVENTION

It is therefore an object of the present invention to provide an improved fishing alarm device.

It is a further feature of the present invention to provide an improved alarm device for fishing that is easily attached to a fishing rod.

It is a further feature of the present invention to provide an improved alarm device for fishing that is capable of freely standing apart from a fishing rod but capable of alerting a fisher of a fish strike.

It is a further feature of the present invention to provide an improved alarm device for fishing that has multiple alarm means.

It is a further feature of the present invention to provide an improved alarm device for fishing that is sturdy, yet, light weight so as to withstand typical use of the device while allowing for easy transportation and storage.

It is a further feature of the present invention to provide an improved alarm device for fishing that is affordable.

It is a further feature of the present invention to provide an improved alarm device for fishing that is easily serviced by the user at low cost.

It is a further feature of the present invention to provide an improved alarm device for fishing that is water tight.

Briefly described according to one embodiment of the present invention, a free standing fishing alarm is provided in which the head or tail member(s) may be threadably attached to the body member, creating a water tight environment for the circuitry and associated components, or removed from the body member to allow service and maintenance of the device. The body member internally houses the circuitry, including batteries, and the lighting and audible signaling means. The body member externally houses a clamp means, a toggle switch, a fastening means, and two opposable ends with threads for receiving the head and tail members so as to provide a unified device. A user can simply attach the device to a fishing rod or a stake, cast the fishing line, place the line within the clamp means, flip the toggle switch "on" and wait for the "big one" to strike.

Another preferred embodiment of the present invention provides for a second clamp means located along the external circumference of the body member approximately 180° apart from the first clamp means. The addition of a second clamp means allows multiple lines to be monitored by the free standing fishing alarm.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 7.

1. Detailed Description of the Figures

Figure 1:
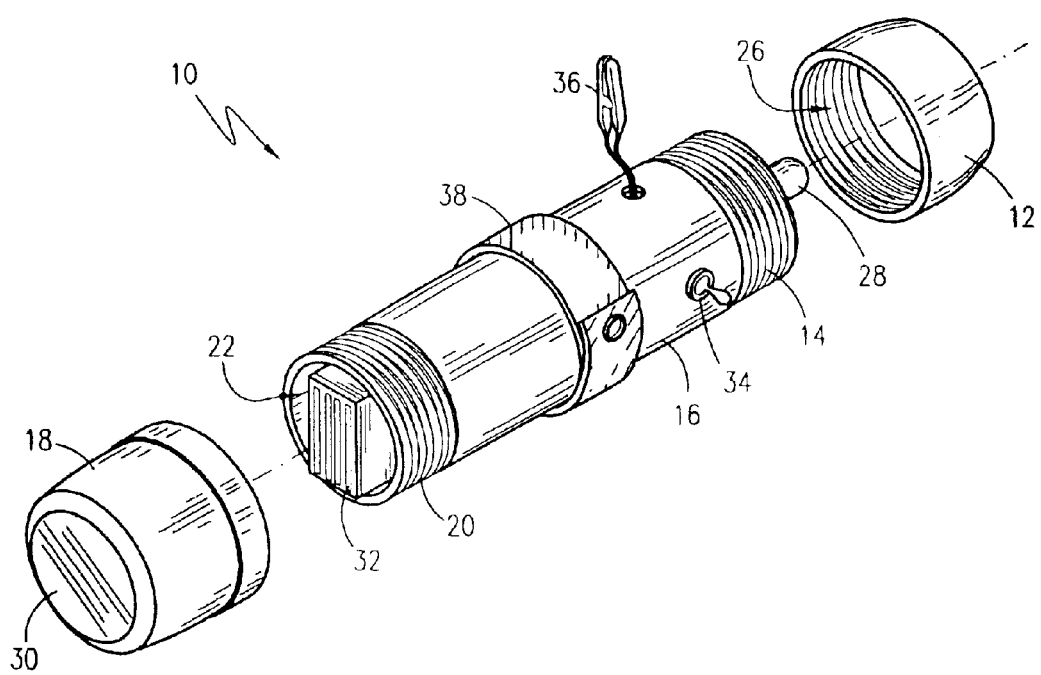
FIG. 1 is an exploded perspective of a free standing fishing alarm in which the head, body and tail members are detached from one another.

Referring now to FIG. 1, a free standing fishing alarm 10 is shown, in accordance with the present invention, and includes a linearly elongated tri-member tubular frame with a head member 12 threadably coupled to the first collar 14 of a body member 16, and a tail member 18 threadably coupled to the second collar 20 of a body member 16, and with the coupling of the head, body and tail members 12, 16 and 18, respectively, forming a linearly elongated tubular internal cavity 22 for housing the electrical circuitry 24 (not shown in FIG. 1, see FIG. 6 and FIG. 7) of the free standing fishing alarm 10. The head member 12 includes a first aperture 26 capable of receiving the lighting means 28. The tail member 18 includes a second aperture 30 capable of receiving the audible means 32. Preferably, the head, body and tail members 12, 16 and 18, respectively, are manufactured from a durable material, such as plastic, so as to withstand typical wear and tear expected in the use and storage of the free standing fishing alarm 10, while providing a light weight device easily handled and transported.

Figure 2:
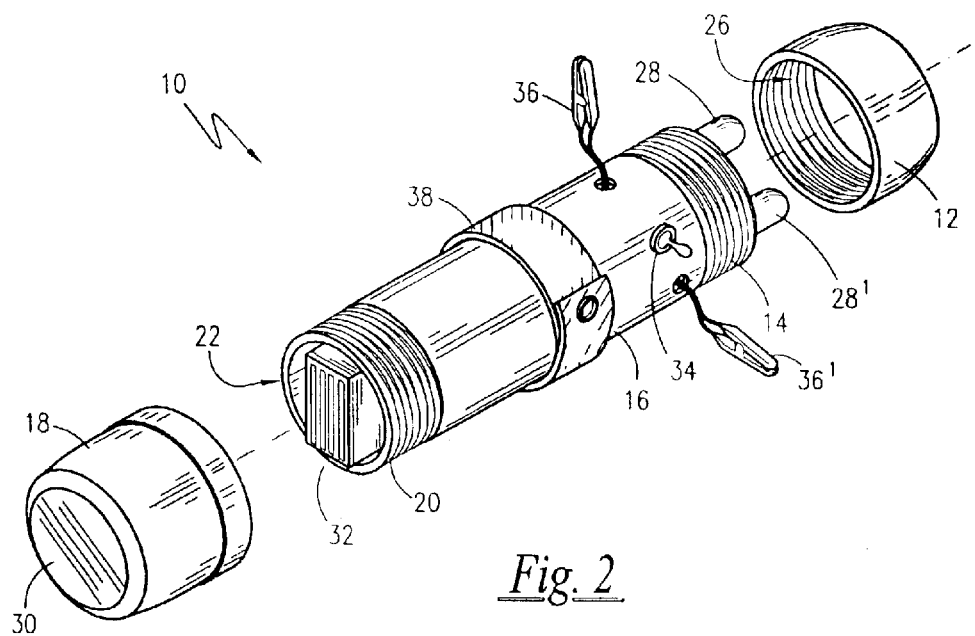
FIG. 2 is an exploded perspective of an alternative embodiment of the apparatus of FIG. 1 in which a second clamp means is shown.

The body member 16 includes a lighting means 28 projecting from the top portion of the internal cavity 22, an audible means 32 projecting from the base portion of the internal cavity 22, and a battery base 40 (not shown here, see FIG. 3) internally housed within the body member 16. The body member 16 further includes a thread-bearing first collar 14 for threadably coupling the body member 16 to the head member 12. The body member 16 further includes a toggle switch 34, lying perpendicular to the curvilinear plane of the body member 16, for activating and deactivating the free standing fishing alarm 10. The body member 16 further includes a spring-urged clamp means 36 through which a fishing line is placed. The body member 16 further includes a thread-bearing second collar 20 for threadably coupling the body member 16 to the tail member 18. The body member 16 further includes a fastening means 38 for securely fastening the free standing fishing alarm 10 to a fishing rod 42 (not shown in FIG. 1, see FIG. 6) or a stake 44 (not shown in FIG. 1, see FIG. 7). The body member 16 further includes a plurality of openings formed along the curvilinear circumference of the body member 16 for use in allowing circuit wires to pass from the internal cavity 22 of the body member 16 to the clamp means 36 and the on/off switch 36. Referring to FIG. 2, an alternative embodiment of the free standing fishing alarm 10, in which a second clamp means 36' and a second lighting means 28' is shown.

Figure 3:
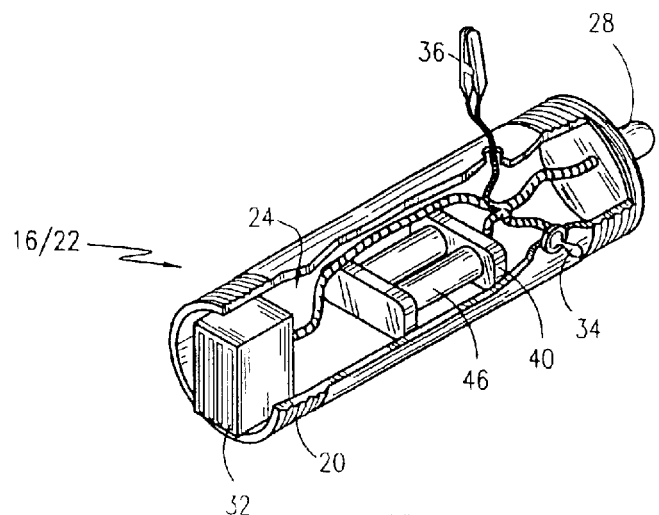
FIG. 3 is a partially exploded perspective of the apparatus of FIG. 1 in which only the body member is shown and the top of the body member frame is removed to illustrate the approximate spatial arrangement of the circuitry housed within the internal cavity of the body member, including the lighting means, the battery base, the audible means and the associated wiring.
Figure 4:
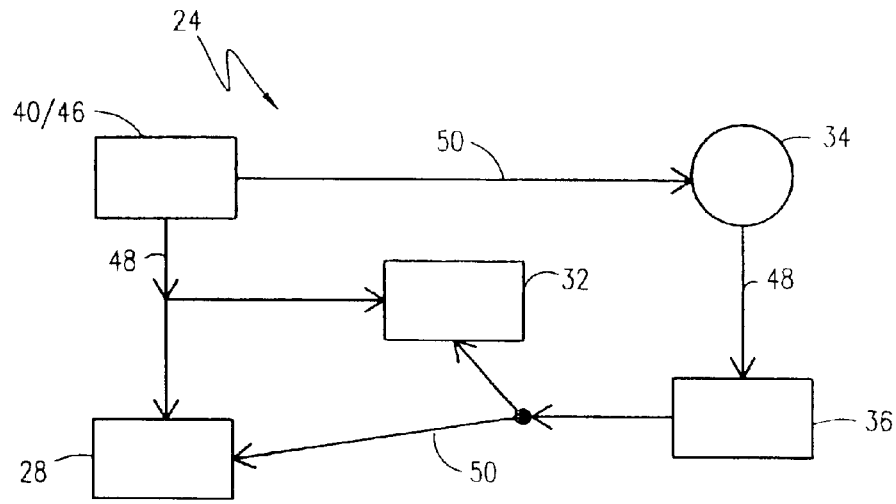
FIG. 4 is a block diagram of the circuitry of the apparatus of FIG. 1.
Figure 5:
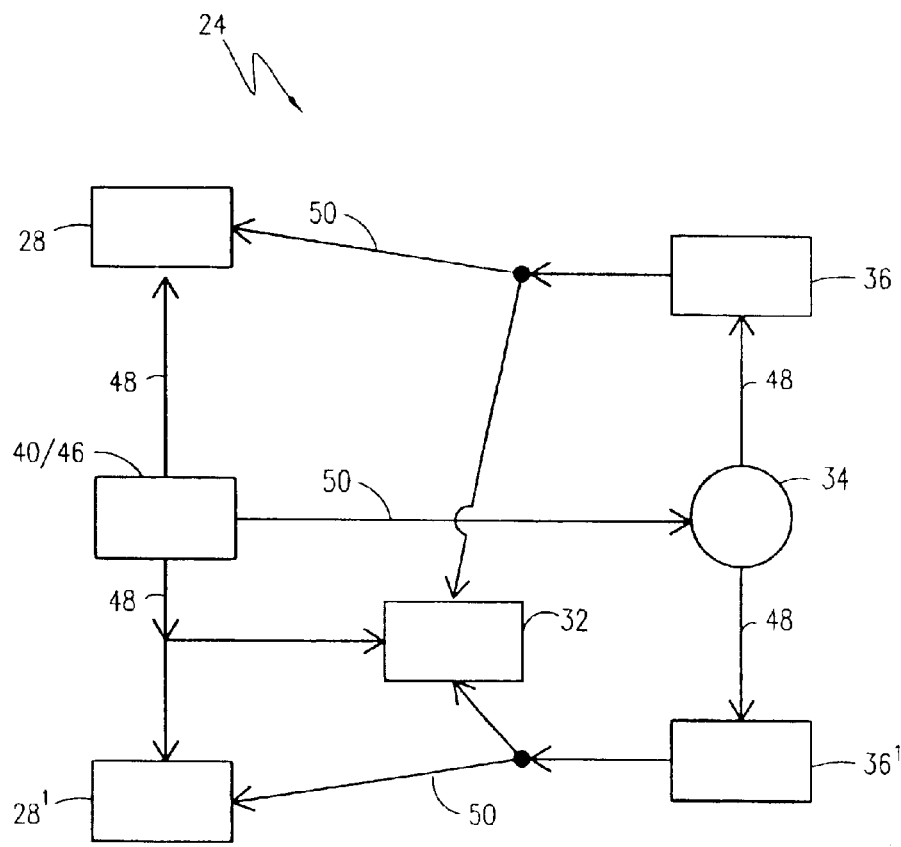
FIG. 5 is a block diagram of the circuitry of the apparatus of FIG. 2.

Referring now to FIG. 3, a cutaway of the body member 16 and internal cavity 22 is shown. The electrical circuitry 24 for a single clamp device (as shown in FIG. 1) is shown as a twisting of ground and positive charged 48 and 50, respectively, wires originating from the battery base 40 and the corresponding batteries 46 (shown here as "AAA" size batteries). Referring now to FIG. 4, a graphical representation of the wiring series is shown, and includes a ground 48 wired from the batteries 46 to the lighting means 28 and the audible means 32, and also includes a positive charge 50 wired from the batteries 46 to the toggle switch 34. A ground 48 is wired from the toggle switch 34 to the clamp means 36. A positive charge 50 is wired from the clamp means 36 to the lighting means 28 and the audible means 32 to complete the wiring series 24. FIG. 5 is a graphical representation of the wiring series for a dual clamp device (as shown in the alternative embodiment of FIG. 2), in which positive charge 50 is further wired from the second clamp means 36' to a second lighting means 28' (shown here as a LED), and the positive charge 50 is wired from the second clamp means 36' in series with the positive charge 50 wired to the audible means 32 (shown here as a buzzer). A diode 52 is wired into the series between the first lighting means 28 and the second lighting means 28'. Lighting means 28 and/or 28' may be selected from a group consisting of red, blue, green, yellow or orange colored light emitting diodes (LED).

Figure 6:
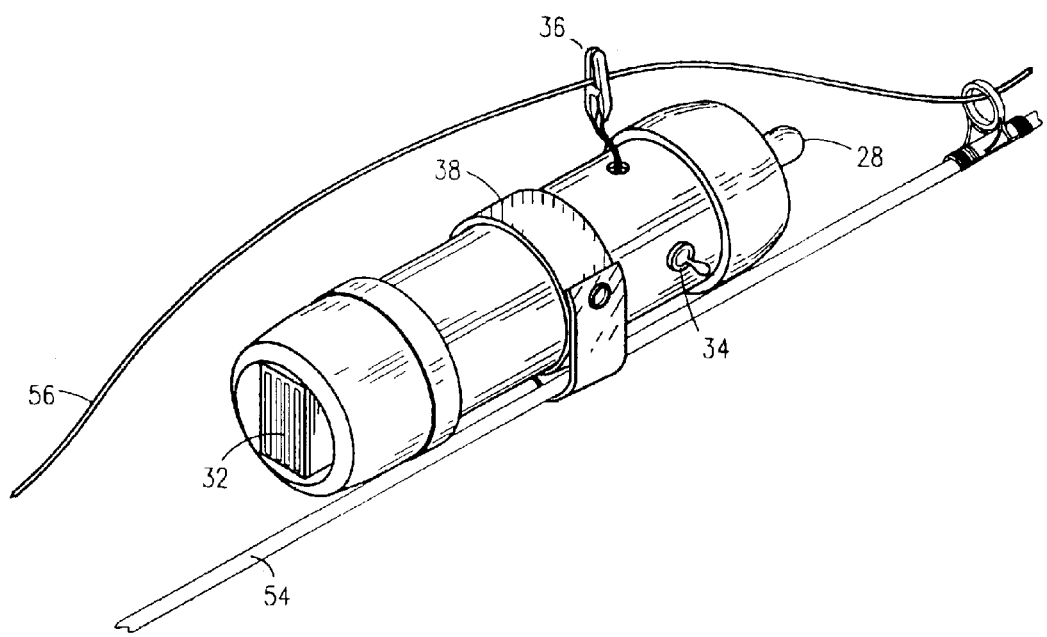
FIG. 6 is a side perspective of the apparatus of FIG. 1 shown attached to a fishing rod and with a fishing line placed within the clamp means.
Figure 7:
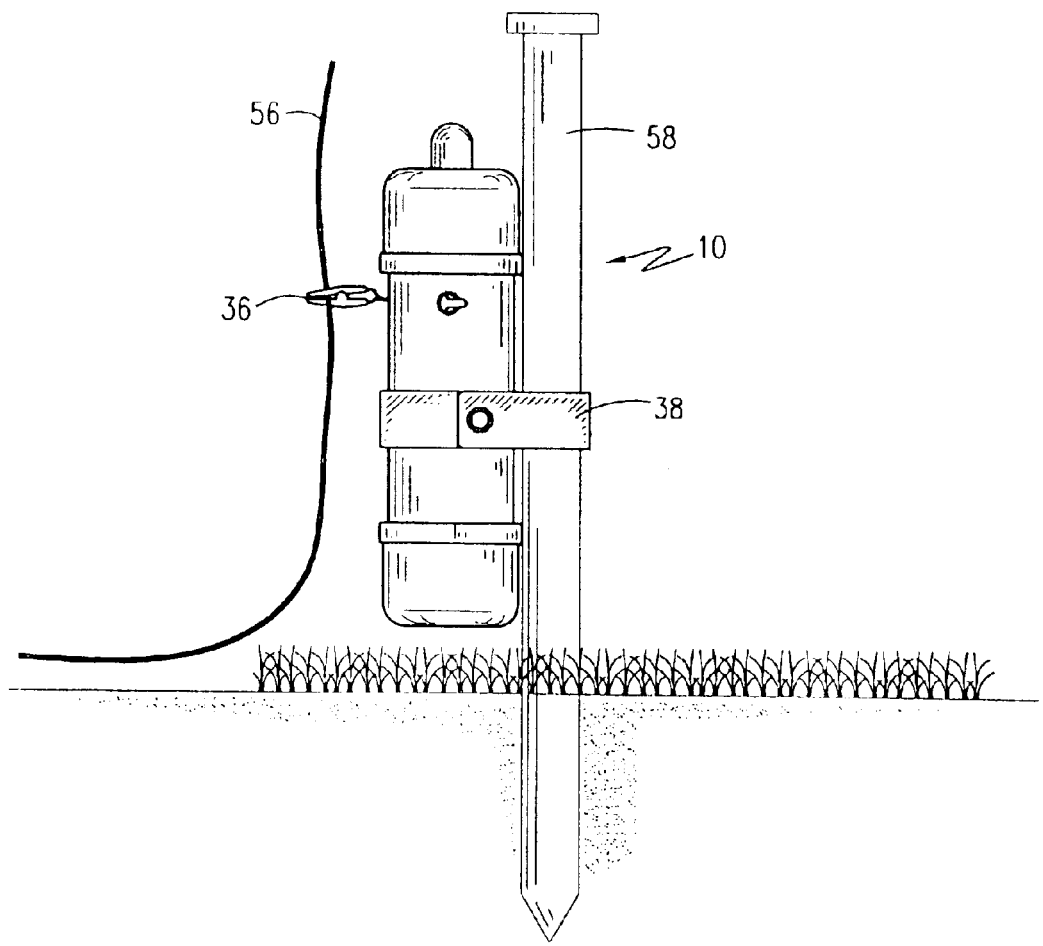
FIG. 7 is a side perspective of the apparatus of FIG. 1 shown attached to a stake and with a fishing line placed within the clamp means.

Referring now to FIG. 6, the free standing fishing alarm 10 is shown fastened to a fishing rod 54 by way of the fasting means 38. The fishing line 56 is placed within the clamp means 36. Referring now to FIG. 7, the free standing fishing alarm 10 is shown fastened to a stake 58 by way of the fasting means 38. The stake 58 is placed into the ground 60 and the fishing line 56 is placed within the clamp means 36. In one embodiment, fastening means 38 is a belt surrounding the circumference of said body member, wherein the belt includes a fastener selected from the group consisting at least one of hook and loop fasteners (VELCRO), button snaps and hooks.

2. Operation of the Preferred Embodiment

The present invention is a tri-member device threadably coupled to provide a unified free standing fishing alarm 10. In complete assembly and operation, the free standing fishing alarm 10 is fastened to a fishing rod 54 or a stake 58 by the fastening means 38. The toggle switch 34 is placed into the "off" position. The fisher will cast the fishing line 56 into a body of water. The fisher will then place the fishing line 56 within the clamp means 36. The fisher will then flip the toggle switch 34 to the "on" position to set the alarm system. If a fish strikes the fishing line 56 with a force sufficient to pull the fishing line 56 from the clamp means 36, the two jaws of the clamp means 36 will come into contact and will cause an electrical relay triggering the alarm system, which will result in the lighting means 28 to light and the audible means 32 to emit an audible signal. The fisher will then flip the toggle switch 34 to the "off" position and focus on the fish striking the fishing line 56.

The above procedure may be performed repeatedly, and regardless of the number of clamp means 36 or 36' used by the fisher.

To replace the batteries 46, the user will threadably decouple the tail member 18 from the body member 16, thereby exposing the audible means 32. To access the battery base 40, the user will gently remove the audible means 32 from the lower portion of the internal cavity 22. The user may then access the battery base 40 and replace the dead batteries 46. The user will then return the battery base 40 to the internal cavity 22 and then return the audible means 32 into the internal cavity 22. The user will then threadably couple the tail member 18 to the body member 16, and the free standing fishing alarm 10 is ready for use again.

A user may threadably remove the head member 12 to expose the wiring of the clamp means 36, the toggle switch 34, or the lighting means 28.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A free standing fishing alarm comprising:
    a linearly elongated tubular body member, wherein said body member has a first collar and a second collar;
    a head member coupled to said first collar;
    a tail member coupled to said second collar;
    lighting means projecting from an internal cavity of said body member and through said head member for use as a visual alarm;
    clamp means projecting from an outer circumference of said body member for holding a fishing line, said clamp means comprising a pair of spring-urged jaws so when said fishing line is removed from said pair of jaws, said pair of jaws are urged into contact and initiate an electrical relay actuating said lighting means as a visual alarm and actuating audible means as an audible alarm;
    said audible means projecting from the internal cavity of said member and through said tail member;
    an on/off switch electrically coupled to said clamp means, said lighting means and said audible means for enabling and disabling said fishing alarm; and
    fastening means for securing fishing alarm to a fishing rod or stake.

2. The fishing alarm of claim 1, wherein said body member includes:
    a thread bearing first collar;
    a thread bearing second collar positioned opposite to said first collar; and
    a plurality of openings formed along the curvilinear circumference of said body member for use in allowing circuit wires to pass from said internal cavity of said body member to said clamp means and said on/off switch.

3. The fishing alarm of claim 1, wherein said head member includes:
    a first aperture for projection of said lighting means; and
    internal threads for coupling said head member to said first collar of said body member.

4. The fishing alarm of claim 1, wherein said tail member includes:
    a second aperture for projection of said audible means; and
    internal threads for coupling said tail member to said second collar of said body member.

5. The fishing alarm of claim 1, wherein said lighting means is a light emitting diode.

6. The fishing alarm of claim 1, wherein said lighting means is a light emitting diode selected from a group consisting at least one of red, blue, green, yellow or orange colored light emitting diodes.

7. The fishing alarm of claim 1, wherein said audible means is an amplified receiver for transmitting an audible alarm signal.

8. The fishing alarm of claim 1, wherein said on/off switch is a toggle switch for enabling and disabling said fishing alarm.

9. The fishing alarm of claim 1, wherein said fastening means is a belt surrounding the circumference of said body member, wherein said belt includes a fastener selected from the group consisting at least one of hook and loop fasteners, button snaps and hooks.

10. The fishing alarm of claim 1 further comprising a plurality of clamp means, wherein each one of said plurality of clamp means holds a separate fishing line from a plurality of fishing rods.

11. The fishing alarm of claim 1 further comprising a plurality of lighting means, wherein each one of said plurality of lighting means indicates release of a separate fishing line from a plurality of fishing rods.

12. A free standing fishing alarm comprising:
    a linearly elongated tubular body member, wherein said body member has a first collar and a second collar;
    a head member coupled to said first collar;
    a tail member coupled to said second collar;
    at least one lighting means projecting from an internal cavity of said body member and through said head member for use as a visual alarm;
    at least one clamp means projecting from an outer circumference of said body member for holding a fishing line, said clamp means comprising a pair of spring-urged jaws so when said fishing line is removed from said pair of jaws, said pair of jaws are urged into contact and initiate an electrical relay actuating said lighting means as a visual alarm;
    an on/off switch electrically coupled to said clamp means and said lighting means for enabling and disabling said fishing alarm; and
    fastening means for securing fishing alarm to a fishing rod or stake.

13. The fishing alarm of claim 12 further comprising a plurality of clamp means, wherein each one of said plurality of clamp means holds a separate fishing line from a plurality of fishing rods.

14. The fishing alarm of claim 13 further comprising a plurality of lighting means, wherein each one of said plurality of lighting means indicates release of a separate fishing line from a plurality of fishing rods.

15. The fishing alarm of claim 14, wherein said plurality of lighting means comprises a light emitting diode selected from the group consisting at least one of red, blue, green, yellow or orange colored light emitting diodes.

16. The fishing alarm of claim 12 further comprising audible means, wherein said audible means is an amplified receiver for transmitting an audible alarm signal.

17. The fishing alarm of claim 12, wherein said fastening means is a belt surrounding the circumference of said body member, wherein said belt includes a fastener selected from the group consisting at least one of hook and loop fasteners, button snaps and hooks.

* * * * *